(12) United States Patent  
Bao

(10) Patent No.: US 8,379,811 B2
(45) Date of Patent: Feb. 19, 2013

(54) SYSTEM AND METHOD FOR TRANSMITTING COMMUNICATION DATA

(75) Inventor: Jing Bao, Shenzhen (CN)

(73) Assignees: Shenzhen Futaihong Precision Industry Co., Ltd., Shenzhen (CN); Chi Mei Communication Systems, Inc., New Taipei (TW)

( * ) Notice: Subject to any disclaimer, the term of this patent is extended or adjusted under 35 U.S.C. 154(b) by 688 days.

(21) Appl. No.: 12/612,033

(22) Filed: Nov. 4, 2009

(65) Prior Publication Data

US 2010/0239079 A1    Sep. 23, 2010

(30) Foreign Application Priority Data

Mar. 17, 2009  (CN) .......................... 2009 1 0300922

(51) Int. Cl.
*H04M 3/00* (2006.01)
*H04B 1/00* (2006.01)
*G06F 13/40* (2006.01)
*G08B 13/14* (2006.01)

(52) U.S. Cl. ...... 379/110.01; 36/137; 235/375; 235/384; 235/451; 235/492; 320/106; 320/109; 324/76.49; 340/5.72; 340/10.1; 340/10.52; 340/539.13; 340/572.4; 370/279; 370/329; 370/338; 375/259; 379/45; 424/523; 455/41.2; 455/418; 455/567; 700/95; 701/300; 705/3; 705/18; 705/26.1; 705/34; 705/44; 709/203; 709/219; 710/110; 713/182; 713/186; 726/7

(58) Field of Classification Search ............... 235/375, 235/384, 451, 492; 320/106, 109; 340/5.92, 340/10.1, 10.2, 10.34, 572.1, 572.4, 5.73, 340/10.52, 539.13; 370/279, 329, 338; 379/110.01, 379/45; 424/523; 455/41.2, 418, 567; 705/7.13, 705/14.39, 18, 34, 3, 26.1, 39, 44; 710/110; 36/137; 324/76.49; 375/259; 700/95; 701/300; 709/203, 219; 713/182, 186

See application file for complete search history.

(56) References Cited

U.S. PATENT DOCUMENTS 6,919,807 B2 *   7/2005  Shek et al. ............... 340/572.1
7,103,433 B1 *   9/2006  Yuan et al. .................. 700/95
(Continued)

FOREIGN PATENT DOCUMENTS

CN    101137998 A    3/2008
CN    101146300 A    3/2008
(Continued)

*Primary Examiner* — Gerald Gauthier
(74) *Attorney, Agent, or Firm* — Altis Law Group, Inc.

(57) ABSTRACT

A system and method for transmitting communication data of a fixed line phone include acquiring the communication data of the fixed line phone, writing the communication data into a radio frequency identification (RFID) tag. The system and method further include establishing a communication between the fixed line phone and a handheld device using the RFID tag and a RFID reader of the handheld device, and transmitting the communication data in the RFID tag to the RFID reader.

21 Claims, 4 Drawing Sheets

U.S. PATENT DOCUMENTS

| | | | | |
|---|---|---|---|---|
| 7,126,481 B2 * | 10/2006 | Vesikivi et al. | | 340/572.4 |
| 7,213,766 B2 * | 5/2007 | Ryan et al. | | 235/492 |
| 7,375,616 B2 * | 5/2008 | Rowse et al. | | 340/10.1 |
| 7,420,458 B1 * | 9/2008 | Kuzma et al. | | 340/10.34 |
| 7,468,650 B2 * | 12/2008 | Childress et al. | | 340/5.92 |
| 7,504,939 B2 * | 3/2009 | Zancola et al. | | 340/539.13 |
| 7,664,234 B2 * | 2/2010 | Cacioppo et al. | | 379/45 |
| 7,921,297 B2 * | 4/2011 | Ortiz et al. | | 713/182 |
| 7,983,349 B2 * | 7/2011 | Kennedy et al. | | 375/259 |
| 8,025,226 B1 * | 9/2011 | Hopkins et al. | | 235/384 |
| 8,077,042 B2 * | 12/2011 | Peeters | | 340/572.1 |
| 8,089,344 B1 * | 1/2012 | Zand | | 340/10.2 |
| 8,243,661 B2 * | 8/2012 | Agrawal et al. | | 370/329 |
| 8,253,543 B2 * | 8/2012 | Yamamoto | | 340/10.52 |
| 2003/0163710 A1 * | 8/2003 | Ortiz et al. | | 713/186 |
| 2004/0153344 A1 * | 8/2004 | Bui et al. | | 705/3 |
| 2004/0155778 A1 * | 8/2004 | Shek et al. | | 340/572.1 |
| 2005/0197062 A1 * | 9/2005 | Sprogis | | 455/41.2 |
| 2007/0037605 A1 * | 2/2007 | Logan | | 455/567 |
| 2007/0100677 A1 * | 5/2007 | Boss et al. | | 705/9 |
| 2007/0124077 A1 * | 5/2007 | Hedlund | | 701/300 |
| 2007/0156579 A1 * | 7/2007 | Manesh | | 705/39 |
| 2007/0198410 A1 * | 8/2007 | Labgold et al. | | 705/44 |
| 2007/0210162 A1 * | 9/2007 | Keen et al. | | 235/451 |
| 2008/0074264 A1 * | 3/2008 | Sharpe et al. | | 340/572.1 |
| 2008/0123568 A1 * | 5/2008 | Rofougaran | | 370/279 |
| 2008/0183581 A1 * | 7/2008 | Coppolani et al. | | 705/14 |
| 2008/0252415 A1 * | 10/2008 | Larson et al. | | 340/5.73 |
| 2009/0051490 A1 * | 2/2009 | Childress et al. | | 340/5.92 |
| 2009/0132381 A1 * | 5/2009 | Gangi | | 705/18 |
| 2009/0206151 A1 * | 8/2009 | Morita | | 235/375 |
| 2009/0207824 A1 * | 8/2009 | Lee et al. | | 370/338 |
| 2009/0246289 A1 * | 10/2009 | Superko et al. | | 424/523 |
| 2009/0248555 A1 * | 10/2009 | Sada et al. | | 705/34 |
| 2009/0259786 A1 * | 10/2009 | Lin et al. | | 710/110 |
| 2009/0265381 A1 * | 10/2009 | Canu et al. | | 707/104.1 |
| 2010/0013434 A1 * | 1/2010 | Taylor-Haw et al. | | 320/109 |
| 2010/0026454 A1 * | 2/2010 | Rowse et al. | | 340/10.1 |
| 2010/0063893 A1 * | 3/2010 | Townsend | | 705/26 |
| 2010/0171460 A1 * | 7/2010 | Nakajima et al. | | 320/106 |
| 2010/0239079 A1 * | 9/2010 | Bao | | 379/110.01 |
| 2010/0259388 A1 * | 10/2010 | Menzel | | 340/572.1 |
| 2010/0271003 A1 * | 10/2010 | Jensen et al. | | 324/76.49 |
| 2010/0323678 A1 * | 12/2010 | Corda et al. | | 455/418 |
| 2011/0022655 A1 * | 1/2011 | Pinnick et al. | | 709/203 |
| 2011/0094127 A1 * | 4/2011 | Dana, III | | 36/137 |
| 2011/0113122 A1 * | 5/2011 | Drope | | 709/219 |
| 2011/0191840 A1 * | 8/2011 | Ortiz et al. | | 726/7 |

FOREIGN PATENT DOCUMENTS

CN            101197683 A        6/2008

* cited by examiner

SYSTEM AND METHOD FOR TRANSMITTING COMMUNICATION DATA

BACKGROUND

1. Technical Field

Embodiments of the present disclosure relate to data managing, and more particularly to a system and method for transmitting communication data of a fixed line phone.

2. Description of Related Art

Mobile phones may record various information of contacts, such as contact names, phone numbers, and E-mail addresses, for example. People may easily know a contact name of an incoming call if a phone number of the incoming call has been stored in a contact list of the mobile phone. However, a fixed line phone cannot provide the contact name of an incoming call. Furthermore, it is not convenient for people to manage communication records of the fixed line phone, such as the ability to count how many times a designated contact has been called, for example.

What is needed, therefore, is an improved system and method for transmitting communication data of a fixed line phone.

DETAILED DESCRIPTION

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module," as used herein, refers to logic embodied in hardware or firmware, or to a collection of software instructions, written in a programming language, such as, for example, Java, C, or assembly. One or more software instructions in the modules may be embedded in firmware, such as an EPROM. It will be appreciated that modules may comprised connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
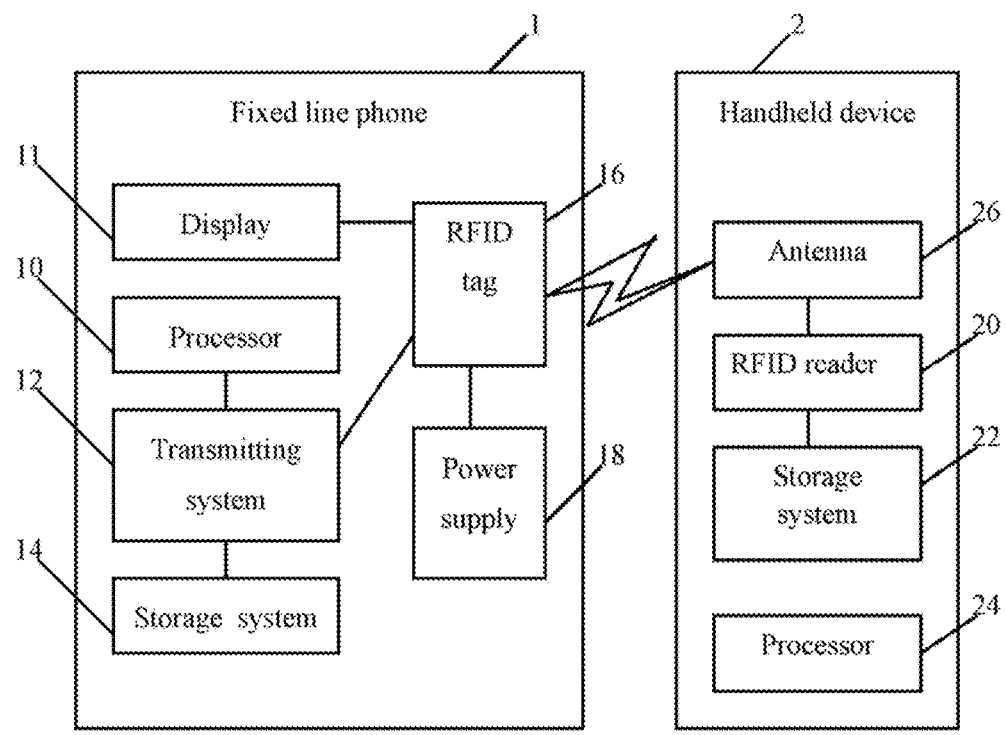
FIG. 1 is a block diagram of one embodiment of a fixed line phone in communication with a handheld device.

FIG. 1 is a block diagram of one embodiment of a fixed line phone 1 in communication with a handheld device 2. The fixed line phone 1 includes a transmitting system 12. The transmitting system 12 may be used to transmit communication data of the fixed line phone 1 to the handheld device 2. The handheld device 2 may manage the communication data, such as to determine communication frequency of one or more specified contacts (e.g., how often has a contact been called) in a contact list of the fixed line phone 1. In one embodiment, a manager of a company may need to view communication data of each fixed line phone in the company so as to save expense. By utilizing the transmitting system 12, the communication data of the fixed line phone 1 may be easily acquired and managed.

The fixed line phone 1 may also include a radio frequency identification (RFID) tag 16 and a power supply 18. The RFID tag 16 may record the communication data of the fixed line phone 1, such as incoming call information, outgoing call information, missed call information, incoming fax information, and/or outgoing fax information, for example. The above mentioned different kinds of call information and fax information may include, but are not limited to, start time, end time, talk time, and phone numbers. The power supply 18 provides power to the RFID tag 16.

The handheld device 2 includes a RFID reader 20, a storage system 22, a processor 24, and an antenna 26. In one embodiment, the handheld device 2 may be a mobile phone, a personal digital assistant, a handheld computer, or any other kind of computing device. The RFID reader 20 may send out radio frequency (RF) signals through the antenna 26 to search RFID tags (e.g., the RFID tag 16) proximate to the handheld device 1. When the RFID reader 20 searches for the RFID tag 16, the RFID reader 20 may read the communication data stored in the RFID tag 16.

The fixed line phone 1 may further include a processor 10, a display 11, and a storage system 12. The display 11 may output visible data, such as a phone number of an incoming call. The processor 10 executes one or more computerized operations of the fixed line phone 1 and other applications, to provide functions of the fixed line phone 1. The storage system 12 stores one or more programs, such as programs of an operating system, other applications of the fixed line phone 1, and various kinds of data, such as the communication data, for example. In one embodiment, the storage system 12 may be a memory of the fixed line phone 1 or an external storage device, such as a memory stick, a subscriber identification module (SIM) card, a smart media card, a compact flash card, or any other type of memory card.

Figure 2:
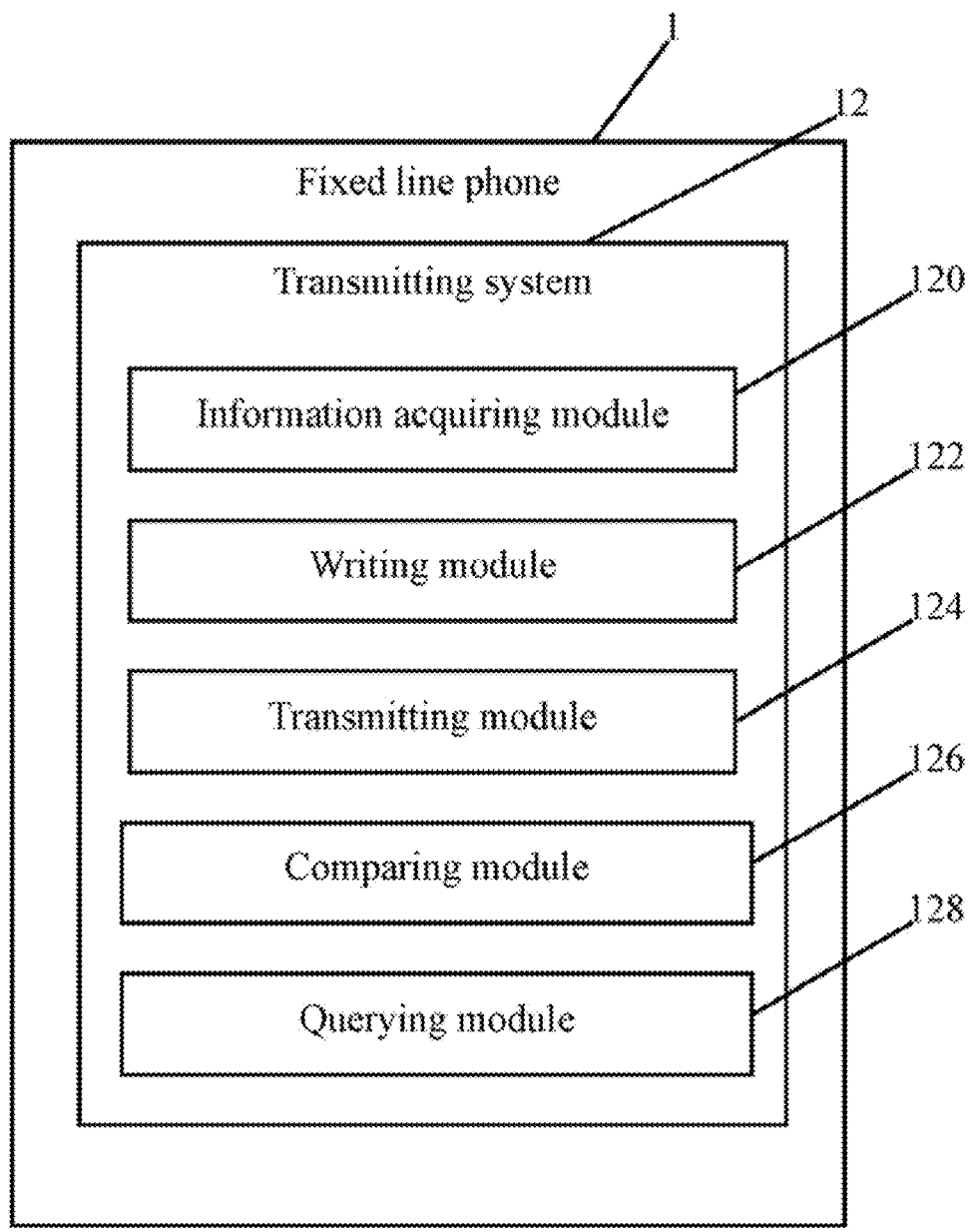
FIG. 2 is a block diagram of one embodiment of the fixed line phone including a transmitting system.

FIG. 2 is a block diagram of one embodiment of the fixed line phone 1 including the transmitting system 12. In one embodiment, the transmitting system 12 includes an information acquiring module 120, a writing module 122, a transmitting module 124, a comparing module 126, and a querying module 128. The modules 120, 122, 124, 126, and 128 may comprise one or more computerized codes to be executed by the processor 10 to perform one or more operations of the fixed line phone 1. Details of these operations will be provided below.

The information acquiring module 120 acquires communication data of the fixed line phone 1, and stores the communication data in the storage system 14. As mentioned above, the communication data of the fixed line phone 1 may include incoming call information, outgoing call information, missed call information, incoming fax information, and/or outgoing fax information, for example. The above mentioned different kinds of call information and fax information may include, but are not limited to, start time, end time, talk time, and phone numbers.

The writing module 122 writes the communication data in the storage system 14 into the RFID tag 16. In one embodiment, the writing module 122 may preset a time interval to write the communication data into the RFID tag 16 periodically. For example, the time interval may be 24 hours. In another embodiment, the writing module 122 also may write the communication data into the RFID tag 16 in real time.

The transmitting module 124 determines if the RFID tag 16 receives any RF signals from the RFID reader 20 of the handheld device 2. If the RFID tag 16 receives the RF signals from the RFID reader 20, the transmitting module 124 establishes a first communication between the fixed line phone 1 and the handheld device 2 using the RFID tag 16 and the RFID reader 20. Then the transmitting module 124 transmits the communication data in the RFID tag 16 to the RFID reader 20. In one embodiment, the communication data may be encoded before being transmitted to the RFID reader 20.

The RFID reader 20 receives the communication data from the RFID tag 16, and stores the received communication data into the storage system 22 of the handheld device 2. A user of the handheld device 2 may view the received communication data on a display, and then modify or delete the received communication data, audit, or calculate specified parameters (e.g., a communication frequency with a specified phone number) according to the received communication data.

If a second communication between the fixed line phone 1 and the handheld device 2 is established, the comparing module 126 compares the communication data in the RFID tag 16 and the RFID reader 20. The comparing module 126 further determines differences between the communication data in the RFID tag 16 and the RFID reader 20. One example of the differences between the communication in the RFID tag 16 and the RFID reader 20 is provided below. For example, the fix line phone 1 may transmit first communication data including four communication records to the handheld device 2 through the first communication. Before the second communication is established, the fix line phone 1 may have received two incoming calls. Thus, when the second communication is established, the fix line phone 1 transmits second communication data to the handheld device 2. The second communication data merely includes the communication records of the two received incoming calls. That is, the fix line phone 1 would not transmit the first communication data to the handheld device 2 again through the second communication.

In one embodiment, the comparing module 126 may determine the differences between the communication data in the RFID tag 16 and the RFID reader 20 by comparing timestamps of a previous communication and a posterior communication between the fix line phone 1 and the handheld device 2. For example, a timestamp of the first communication is AM 9:00, a timestamp of the second communication is AM 12:00, and then the comparing module 126 may determine communication data created between AM 9:00 and AM 12:00.

Then the transmitting module 124 synchronizes the communication data in the RFID tag 16 and the RFID reader 20 by transmitting the differences to the RFID reader 20. The transmission efficiency may be improved if merely transmitting the differences.

The querying module 128 provides a query interface for inputting a query keyword/condition to search and audit the communication data in the RFID tag. In one embodiment, the query keyword is a phone number, and/or a specified time, for example.

Figure 3:
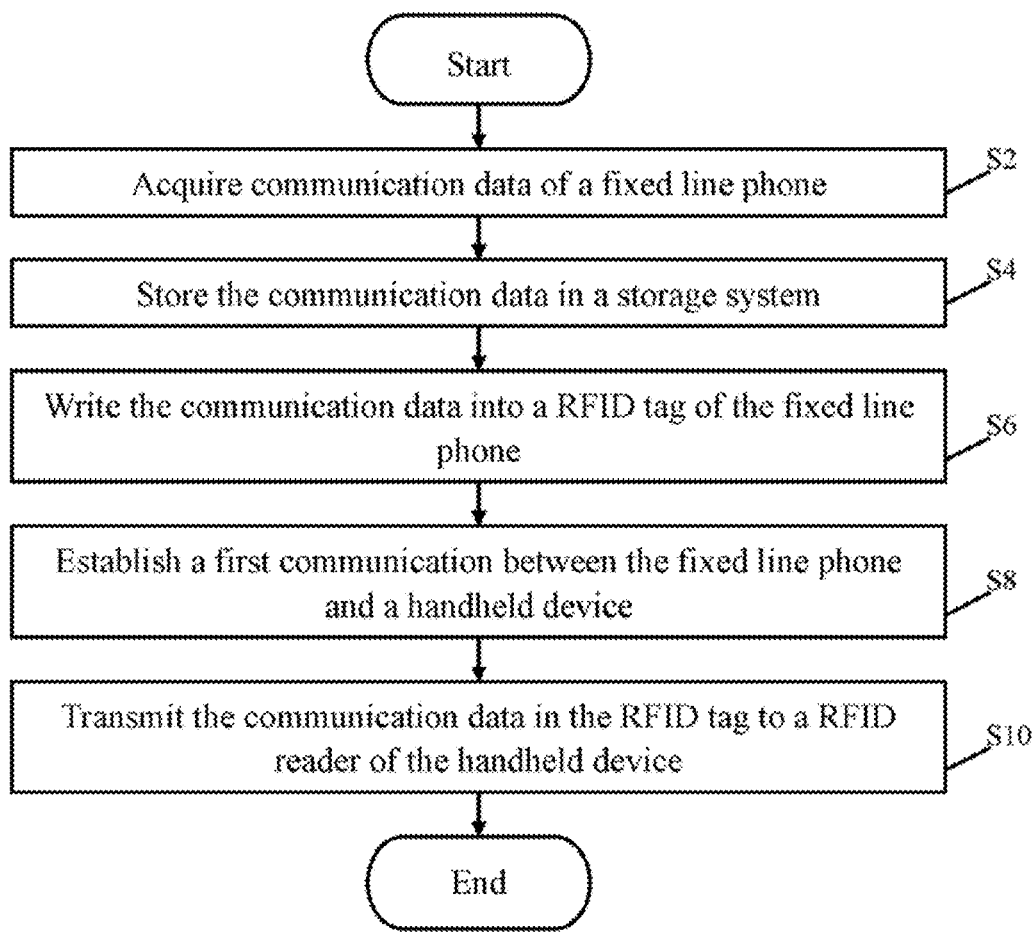
FIG. 3 is a flowchart of one embodiment of a method for transmitting communication data of the fixed line phone 1 of FIG. 1.

FIG. 3 is a flowchart of one embodiment of a method for transmitting communication data of the fixed line phone 1 of FIG. 1. Depending on the embodiment, additional blocks may be added, others removed, and the ordering of the blocks may be replaced.

In block S2, the information acquiring module 120 acquires communication data of the fixed line phone 1. As mentioned above, the communication data of the fixed line phone 1 may include incoming call information, outgoing call information, missed call information, incoming fax information, and/or outgoing fax information, for example.

In block S4, the information acquiring module 120 stores the communication data in the storage system 14.

In block S6, the writing module 122 writes the communication data in the storage system 14 into the RFID tag 16. As mentioned above, the writing module 122 may preset a time interval to write the communication data into the RFID tag 16 periodically, and also may write the communication data into the RFID tag 16 in real time.

In block S8, the transmitting module 124 establishes a first communication between the fixed line phone 1 and the handheld device 2 using the RFID tag 16 and the RFID reader 20 when the RFID tag 16 receives RF signals from the RFID reader 20, the transmitting module 124.

In block S10, the transmitting module 124 transmits the communication data in the RFID tag 16 to the RFID reader 20. As mentioned above, the communication data may be encoded before transmitting to the RFID reader 20.

Figure 4:
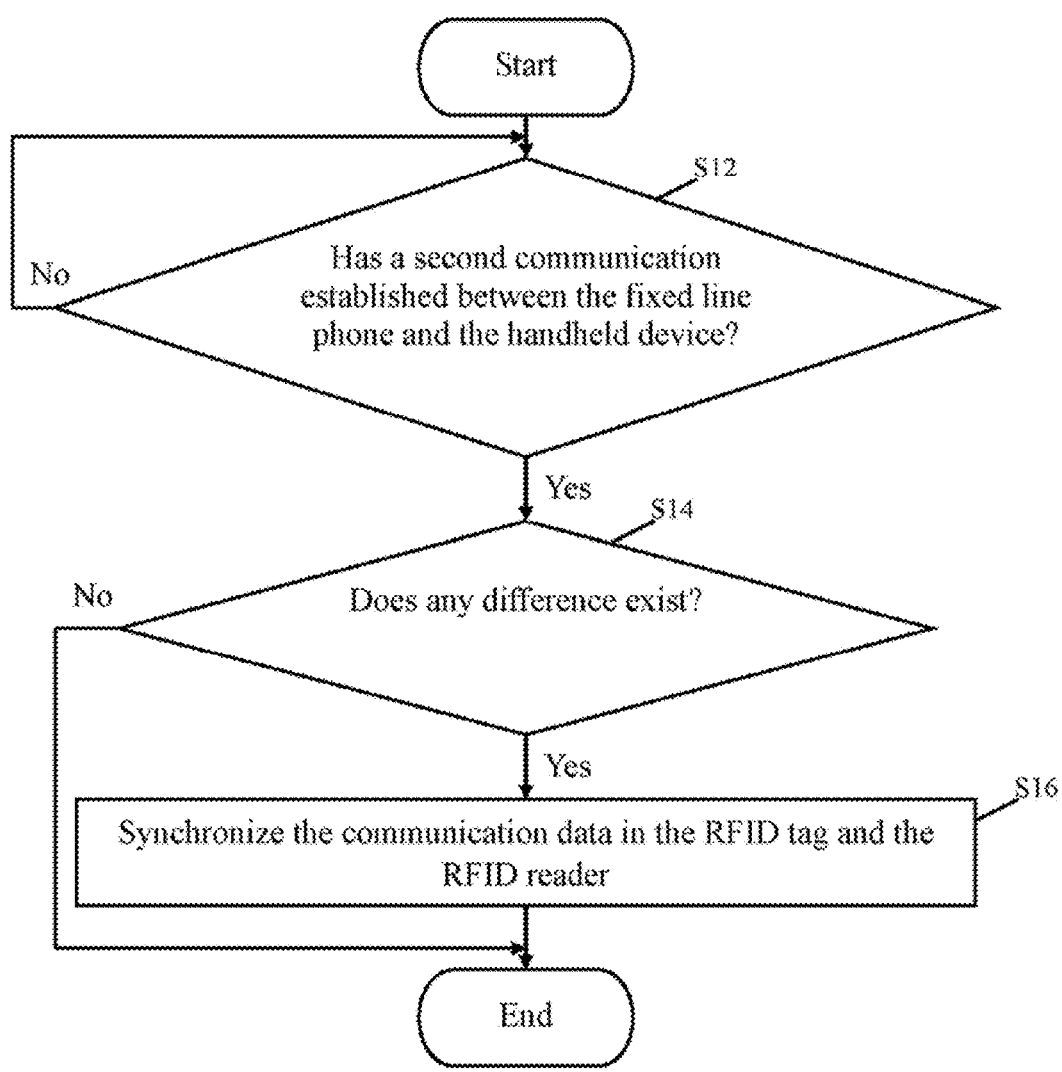
FIG. 4 is a flowchart of one embodiment of a method for acquiring updated communication data of the fixed line phone 1 of FIG. 1.

FIG. 4 is a flowchart of one embodiment of a method for acquiring updated communication data of the fixed line phone 1 of FIG. 1. Depending on the embodiment, additional blocks may be added, others removed, and the ordering of the blocks may be replaced.

In block S12, the transmitting module determines if a second communication between the fixed line phone 1 and the handheld device 2 is established. If no second communication between the fixed line phone 1 and the handheld device 2 is established, the procedure returns to block S12.

If a second communication between the fixed line phone 1 and the handheld device 2 is established, in block S14, the comparing module 126 compares the communication data in the RFID tag 16 and the RFID reader 20, and determines if any differences between the communication data in the RFID tag 16 and the RFID reader 20 exist.

If differences between the communication data in the RFID tag 16 and the RFID reader 20 exist, in block S16, the transmitting module 124 synchronizes the communication data in the RFID tag 16 and the RFID reader 20 by transmitting the differences to the RFID reader 20.

If no differences between the communication data in the RFID tag 16 and the RFID reader 20 exists, the procedure ends.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A method for transmitting communication data of a fixed line phone, the fixed line phone comprising a radio frequency identification (RFID) tag, the method comprising:

acquiring the communication data of the fixed line phone, and storing the communication data in a storage system of the fixed line phone;

writing the communication data in the storage system into the RFID tag;

determining whether the RFID tag receives any radio frequency (RF) signals from a RFID reader of a handheld device;

establishing a first communication between the fixed line phone and the handheld device using the RFID tag and the RFID reader, when the RFID tag receives the RF signals from the RFID reader;

transmitting the communication data in the RFID tag to the RFID reader;

when a second communication between the fixed line phone and the handheld device is established, comparing the communication data in the RFID tag and the RFID reader;

determining differences between the communication data in the RFID tag and the RFID reader; and synchronizing the communication data in the RFID tag and the RFID reader by transmitting the differences to the RFID reader.

2. The method according to claim 1, wherein the communication data of the fixed line phone comprises incoming call information, outgoing call information, missed call information, incoming fax information, and/or outgoing fax information.

3. The method according to claim 1, wherein the communication data are wrote into the RFID tag in real-time or periodically.

4. The method according to claim 1, further comprising:
providing a query interface for inputting a query keyword to search the communication data in the RFID tag.

5. The method according to claim 4, wherein the query keyword is a phone number, and/or a specified time.

6. The method according to claim 1, wherein the differences between the communication data in the RFID tag and the RFID reader are determined by comparing timestamps of the first communication and the second communication between the fix line phone and the handheld device.

7. The method according to claim 6, further comprising:
providing a query interface for inputting a query keyword to search the communication data in the RFID tag.

8. A fixed line phone, the fixed line phone comprising:
a radio frequency identification (RFID) tag;
a storage system;
at least one processor; and
one or more programs stored in the storage system and being executable by the at least one processor, the one or more programs comprising:
an information acquiring module operable to acquire communication data of the fixed line phone, and store the communication data in the storage system;
a writing module operable to write the communication data in the storage system into the RFID tag;
a transmitting module operable to establish a first communication between the fixed line phone and a handheld device using the RFID tag and a RFID reader of the handheld device when the RFID tag receives the RF signals from the RFID reader, and transmit the communication data in the RFID tag to the RFID reader;
a comparing module operable to compare the communication data in the RFID tag and the RFID reader when a second communication between the fixed line phone and the handheld device is established, and determine differences between the communication data in the RFID tag and the RFID reader; and
the transmitting module further operable to synchronize the communication data in the RFID tag and the RFID reader by transmitting the differences to the RFID reader.

9. The fixed line phone according to claim 8, wherein the communication data of the fixed line phone comprises incoming call information, outgoing call information, missed call information, incoming fax information, and/or outgoing fax information.

10. The fixed line phone according to claim 8, wherein the communication data are wrote into the RFID tag in real-time or periodically.

11. The fixed line phone according to claim 8, wherein the one or more programs further comprise a querying module operable to provide a query interface for inputting a query keyword to search the communication data in the RFID tag.

12. The fixed line phone according to claim 11, wherein the query keyword is a phone number, and/or a specified time.

13. The fixed line phone according to claim 8, wherein the comparing module determines the differences between the communication data in the RFID tag and the RFID reader are determined by comparing timestamps of the first communication and the second communication between the fix line phone and the handheld device.

14. The fixed line phone according to claim 13, wherein the one or more programs further comprise a querying module operable to provide a query interface for inputting a query keyword to search the communication data in the RFID tag.

15. A non-transitory storage medium storing a set of instructions, the set of instructions capable of being executed by a processor to perform a method for transmitting communication data of a fixed line phone, the fixed line phone comprising a radio frequency identification (RFID) tag, the method comprising:
acquiring the communication data of the fixed line phone, and storing the communication data in a storage system of the fixed line phone;
writing the communication data in the storage system into the RFID tag;
determining whether the RFID tag receives any radio frequency (RF) signals from a RFID reader of a handheld device;
establishing a first communication between the fixed line phone and the handheld device using the RFID tag and the RFID reader, when the RFID tag receives the RF signals from the RFID reader;
transmitting the communication data in the RFID tag to the RFID reader;
when a second communication between the fixed line phone and the handheld device is established, comparing the communication data in the RFID tag and the RFID reader;
determining differences between the communication data in the RFID tag and the RFID reader; and
synchronizing the communication data in the RFID tag and the RFID reader by transmitting the differences to the RFID reader.

16. The non-transitory storage medium as claimed in claim 15, wherein the communication data of the fixed line phone comprises incoming call information, outgoing call information, missed call information, incoming fax information, and/or outgoing fax information.

17. The non-transitory storage medium as claimed in claim 15, wherein the communication data are wrote into the RFID tag in real-time or periodically.

18. The non-transitory storage medium as claimed in claim 15, wherein the method further comprises:
providing a query interface for inputting a query keyword to search the communication data in the RFID tag.

19. The non-transitory storage medium as claimed in claim 18, wherein the query keyword is a phone number, and/or a specified time.

20. The non-transitory storage medium as claimed in claim 15, wherein the differences between the communication data in the RFID tag and the RFID reader are determined by comparing timestamps of the first communication and the second communication between the fix line phone and the handheld device.

21. The non-transitory storage medium as claimed in claim 20, wherein the method further comprises:
providing a query interface for inputting a query keyword to search the communication data in the RFID tag.

* * * * *